(12) United States Patent
Ruble

(10) Patent No.: US 9,183,650 B2
(45) Date of Patent: Nov. 10, 2015

(54) DATA POINT CALCULATIONS ON A CHART

(71) Applicant: Microsoft Corporation, Redmond, WA (US)

(72) Inventor: Brian Scott Ruble, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 66 days.

(21) Appl. No.: 13/950,056

(22) Filed: Jul. 24, 2013

(65) Prior Publication Data

US 2015/0029194 A1    Jan. 29, 2015

(51) Int. Cl.
*G06T 11/20* (2006.01)
*G06F 17/24* (2006.01)
*G06F 3/048* (2013.01)
*G06F 3/0484* (2013.01)

(52) U.S. Cl.
CPC .......... *G06T 11/206* (2013.01); *G06F 3/04842* (2013.01); *G06F 3/048* (2013.01); *G06F 3/0484* (2013.01); *G06F 17/246* (2013.01); *G06F 2203/04808* (2013.01)

(58) Field of Classification Search
CPC ..... G06T 11/206; G06F 3/048; G06F 3/0484; G06F 3/04842; G06F 17/246; G06F 2203/04808
See application file for complete search history.

(56) References Cited

U.S. PATENT DOCUMENTS

| | | | |
|---|---|---|---|
| 2008/0228439 A1 | 9/2008 | Makihara et al. | |
| 2010/0185984 A1* | 7/2010 | Wright et al. | 715/833 |
| 2011/0115814 A1 | 5/2011 | Heimendinger et al. | |
| 2011/0271172 A1 | 11/2011 | Radakovitz et al. | |
| 2013/0106708 A1 | 5/2013 | Mudu et al. | |
| 2013/0106859 A1 | 5/2013 | Koshi et al. | |
| 2013/0275905 A1* | 10/2013 | Bhaskaran et al. | 715/771 |

FOREIGN PATENT DOCUMENTS

| | | | | |
|---|---|---|---|---|
| JP | 2013120560 | * | 6/2013 | ............ G06F 3/048 |
| JP | 2013120560 A | | 6/2013 | |

OTHER PUBLICATIONS

Title: Charting Kit, Author: Davis Instruments, Date: Jun. 2008, p. 4 Source: http://www.davisnet.com/product_documents/marine/manuals/0083_IM_ChartKit.PDF.*
Wyatt, Allen, "A Ruler in Excel", Published on: Apr. 10, 2011, Available at: http://excel.tips.net/T002484_A_Ruler_in_Excel.html, 3 pages.
"Use Measurement Rulers on a Worksheet", Published on: Oct. 9, 2010, Available at: http://office.microsoft.com/en-in/excel-help/use-measurement-rulers-on-a-worksheet-HP001216384.aspx#BMuserulers, 1 page.

(Continued)

*Primary Examiner* — Jwalant Amin
(74) *Attorney, Agent, or Firm* — Danielle Johnston-Holmes; Steve Crocker; Micky Minhas

(57) ABSTRACT

Data point calculations on a chart are provided. A user control may be displayed adjacent to a chart by a computing device. A selection of data points on the chart may then be received the user control. A calculation may then be performed by the computing device on the data points selected by the user control. The results of the calculation may then be displayed by the computing device on the chart.

20 Claims, 20 Drawing Sheets

(56) References Cited

OTHER PUBLICATIONS

Wyatt, Allen, "Calculating the Distance Between Points", Published on: Apr. 9, 2011, Available at: http://excel.tips.net/T003275_Calculating_the_Distance_between_Points.html, 5 pages.

Rumble, Amanda, "How to Get the Ruler to Show Up in MS Excel", Published on: Mar. 26, 2012, Available at: http://www.ehow.com/how_8320730_ruler-show-up-ms-excel.html, 3 pages.

"Change the Display of Chart Axes", Published on: Jun. 23, 2010, Available at: http://office.microsoft.com/en-us/excel-help/change-the-display-of-chart-axes-HP010342246.aspx, 4 pages.

"Adobe Acrobat X Pro Grids, Guides, and Measurements", Retrieved on: May 20, 2013, Available at: http://help.adobe.com/en_US/acrobat/X/pro/using/WS58a04a822e3e50102bd615109794195ff-7f9d.w.html, 3 pages.

"Show or Hide the Rulers", Published on: Jun. 11, 2010, Available at: http://office.microsoft.com/en-us/word-help/show-or-hide-the-rulers-HA010102271.aspx, 1 pages.

International Search Report and Written Opinion dated Nov. 26, 2014 in Application No. PCT/US2014/047346 (14 pages).

* cited by examiner

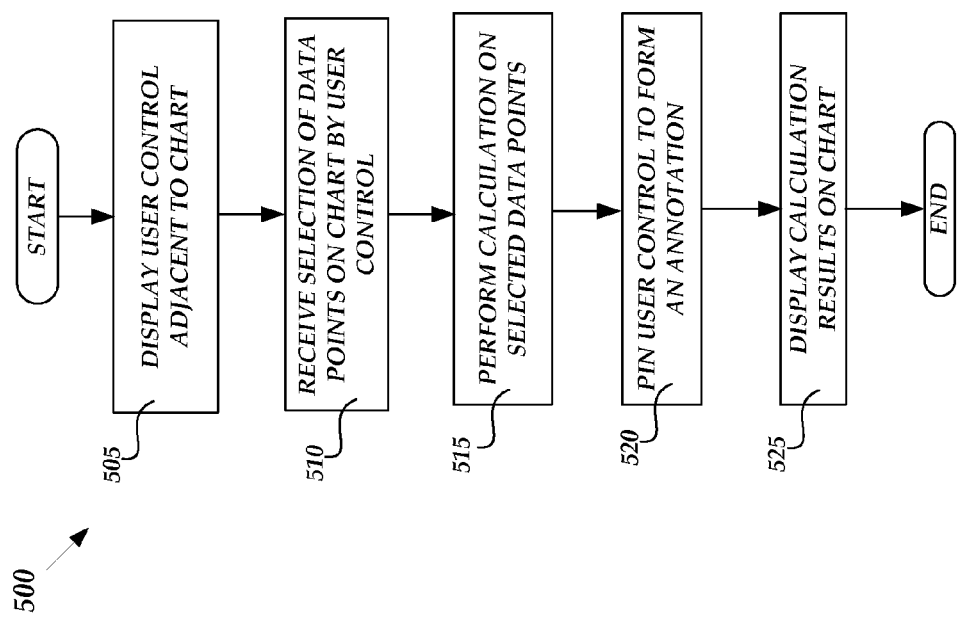

MOBILE COMPUTING DEVICE

DATA POINT CALCULATIONS ON A CHART

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Productivity software applications are often utilized for generating charts from user-provided data. For example, a spreadsheet software application may be utilized to generate a chart of a company's sales data over a predetermined time period. In some instances however, users may have a need to perform calculations on chart data which may be visually displayed as a number of lines or scattered data points on a chart. Current productivity applications however, fail to provide an easy way for users to quickly and accurately perform many desired calculations on chart data. In particular, users wishing to perform distance, difference, average, count and sum calculations are often hindered by the fact that these calculations are not easily performed on visual chart data. For example, a user wishing to determine a difference in data values between data points on multiple line graphs making up a chart, will need to estimate data point values based on a visual inspection of where a particular data point falls on a graph and then mentally perform the desired difference calculation in their head which may be both time consuming and inaccurate. The aforementioned drawbacks may be further exacerbated for more complex calculations such as averages, percentages and the like. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for making data point calculations on a chart. A user control may be displayed adjacent to a chart by a computing device. A selection of data points on the chart may then be received by the user control. A calculation may then be performed by the computing device on the data points selected by the user control. The results of the calculation may then be displayed by the computing device on the chart.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 5 is a flow diagram illustrating a routine for making data point calculations on a chart, in accordance with an embodiment;

DETAILED DESCRIPTION

Embodiments are provided for making data point calculations on a chart. A user control may be displayed adjacent to a chart by a computing device. A selection of data points on the chart may then be received by the user control. A calculation may then be performed by the computing device on the data points selected by the user control. The results of the calculation may then be displayed by the computing device on the chart.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1A:
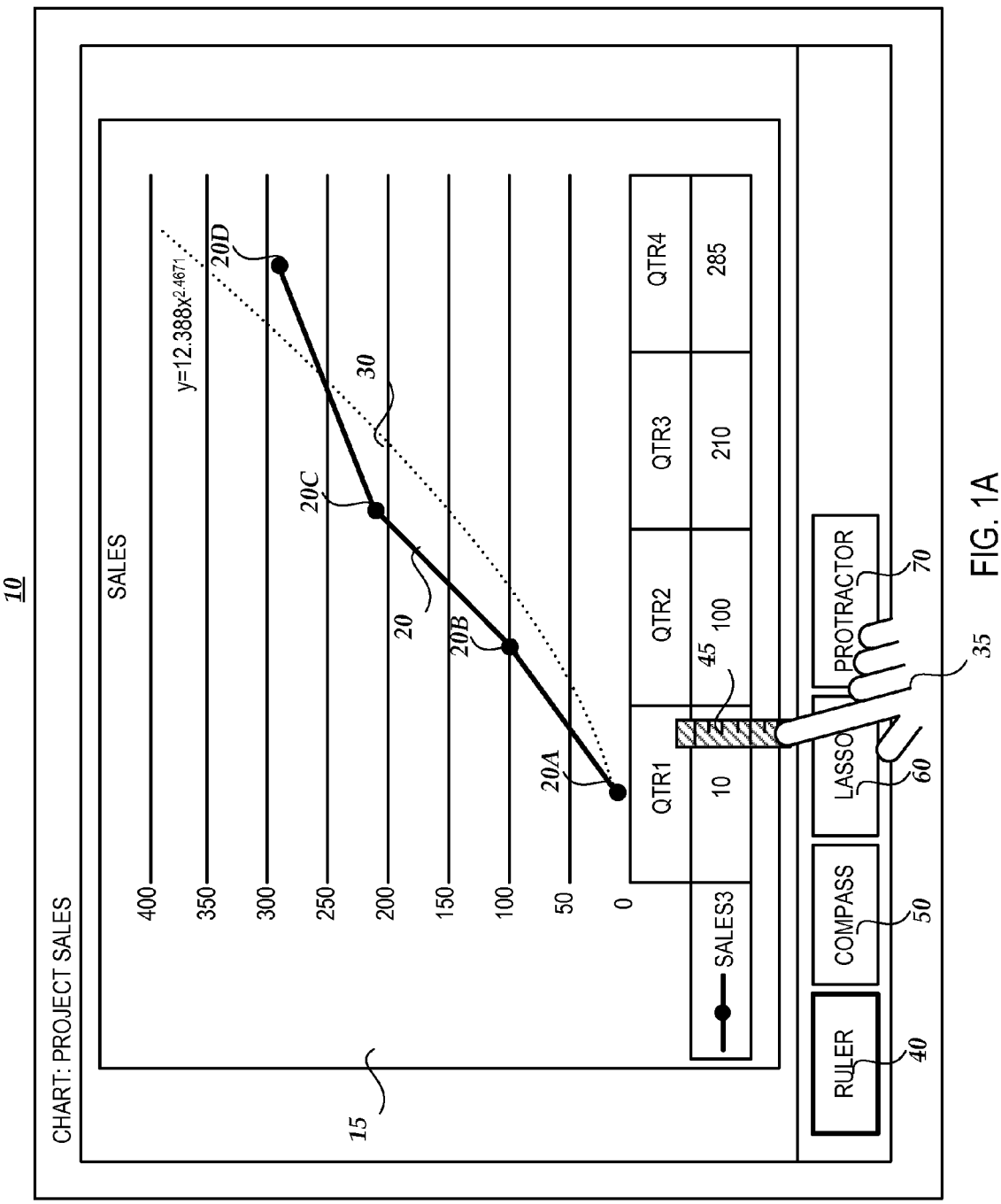
FIG. 1A is a user interface which may be utilized for making data point calculations on a chart, in accordance with an embodiment.

Referring now to the drawings, in which like numerals represent like elements through the several figures, various aspects of the present invention will be described. FIG. 1A is a user interface 10 which may be utilized for making data point calculations on a chart, in accordance an embodiment. The user interface 10 includes a chart 15 comprising data represented by lines 20 and 30. The line 20 further comprises data points 20A, 20B, 20C and 20D. The user interface 10 further comprises user control buttons 40, 50, 60 and 70. As will be described in greater detail herein, the user control buttons 40-70 may be selected to display a user control which may be utilized for making a data point calculations on the chart 15. For example, the user control button 40 (i.e., the Ruler button) may be selected (via touch input using the hand 35 or by other means) to display the ruler user control 45 adjacent to the chart 15.

Figure 1B:
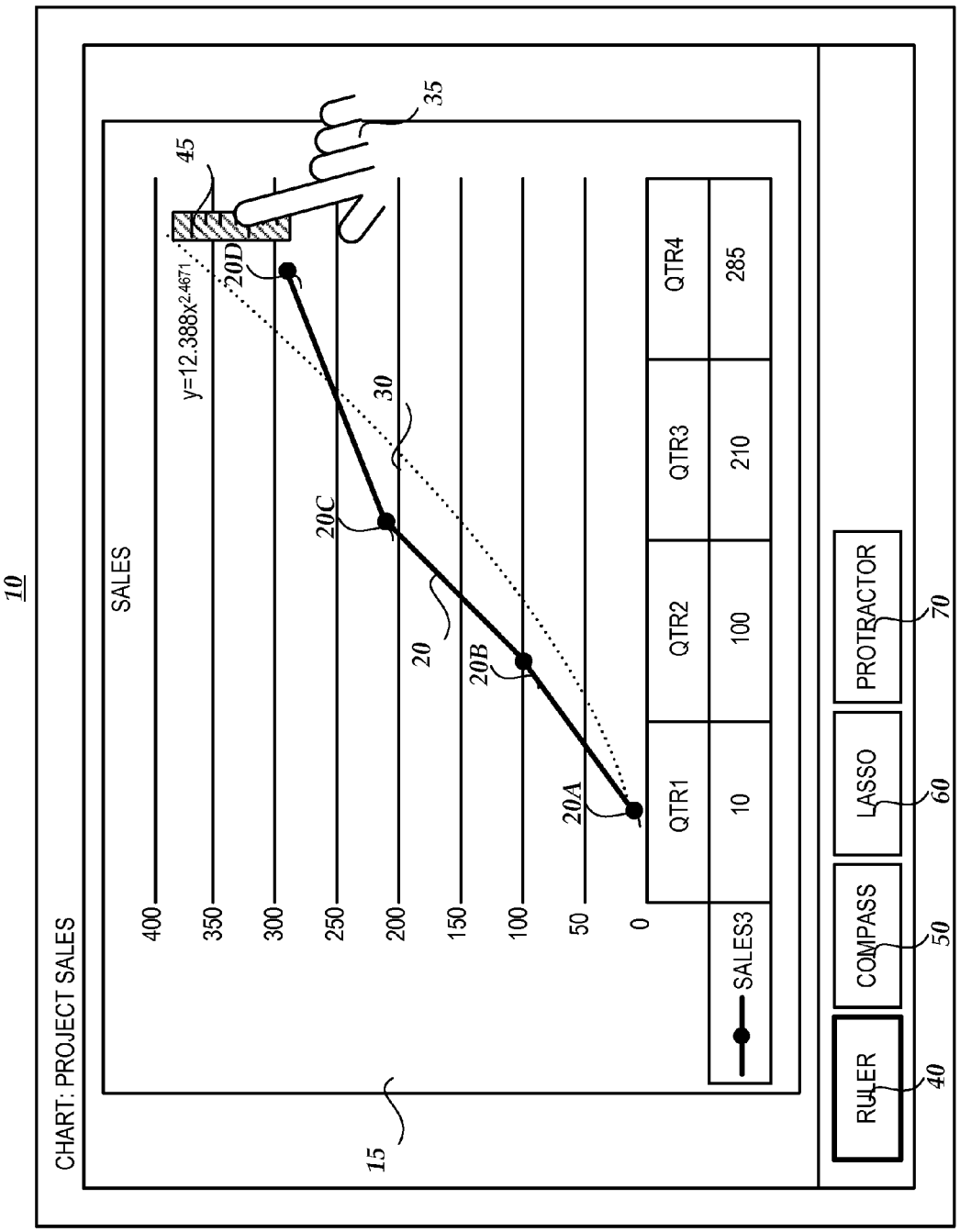
FIG. 1B is a user interface which may be utilized for making data point calculations on a chart, in accordance with an embodiment.

Turning now to FIG. 1B, the user interface 10 shows the ruler user control 45 after being moved by a user to select a set of data points for which a calculation is desired. In particular, the ruler user control 45 is shown as having been moved from the position adjacent the chart 15 (as shown in FIG. 1A) to between the data point 20D and the top of the line 30 on the chart 15. In accordance with an embodiment, the ruler user control 45 may be manually by a user to the desired location on the chart 15. In accordance with another embodiment, the ruler user control 45 may be moved automatically to one or more designated "hot spots" on chart data points the chart 15. For example, the data points 20A-20D may be designated as "hot spots" by a spreadsheet application program utilized to generate the chart 15. In accordance with various embodiments, the data points 20A-20D may be identified as "hot spots" by the application of an effect or emphasis such as highlighting, color or blinking. Other effects may also be utilized. Upon the detection of one or more hot spots (e.g., upon a user moving the ruler user control 45 in proximity), the ends of the ruler user control 45 may automatically move or "snap" to the nearest designated chart data point. After a selection of data points has been made, a desired calculation may be initiated. For example, a difference calculation may be initiated between the between the highest value along the line 30 and the data point 20D (with respect to the y-axis on the chart 15) after a user removes his or her finger from the ruler user control 45. It should be understood that the ruler user control 45 may dynamically conform to an existing scale of chart data. For example, in the chart 15, the y-axis has a value range from 0 to 400. Accordingly, the ruler user control 45 will have a scale that will correspond to the aforementioned value range. As another example, if the y-axis has a value range from 0 to 100,000, then the ruler user control 45 will have a scale corresponding to this particular value range. Thus, it should be appreciated that the scale of the ruler user control 45 may vary according to a value range of data being measured.

As will be described in greater detail herein, a variety of different calculations may be performed on selected data in a chart. Thus, as discussed above, in accordance with an embodiment, a difference calculation may be performed between the highest value along the line 30 and the data point 20D with respect to the y-axis on the chart 15. As another example, the ruler user control 45 may be rotated to perform a different type of calculation such as measuring an angle between two data points. It should be understood that similar calculations may also be performed with respect to the x-axis (as well as a z-axis, if present) for displayed chart data. Illustrative examples of other types of calculations which may be performed will be described in FIGS. 2-4, below.

Figure 1C:
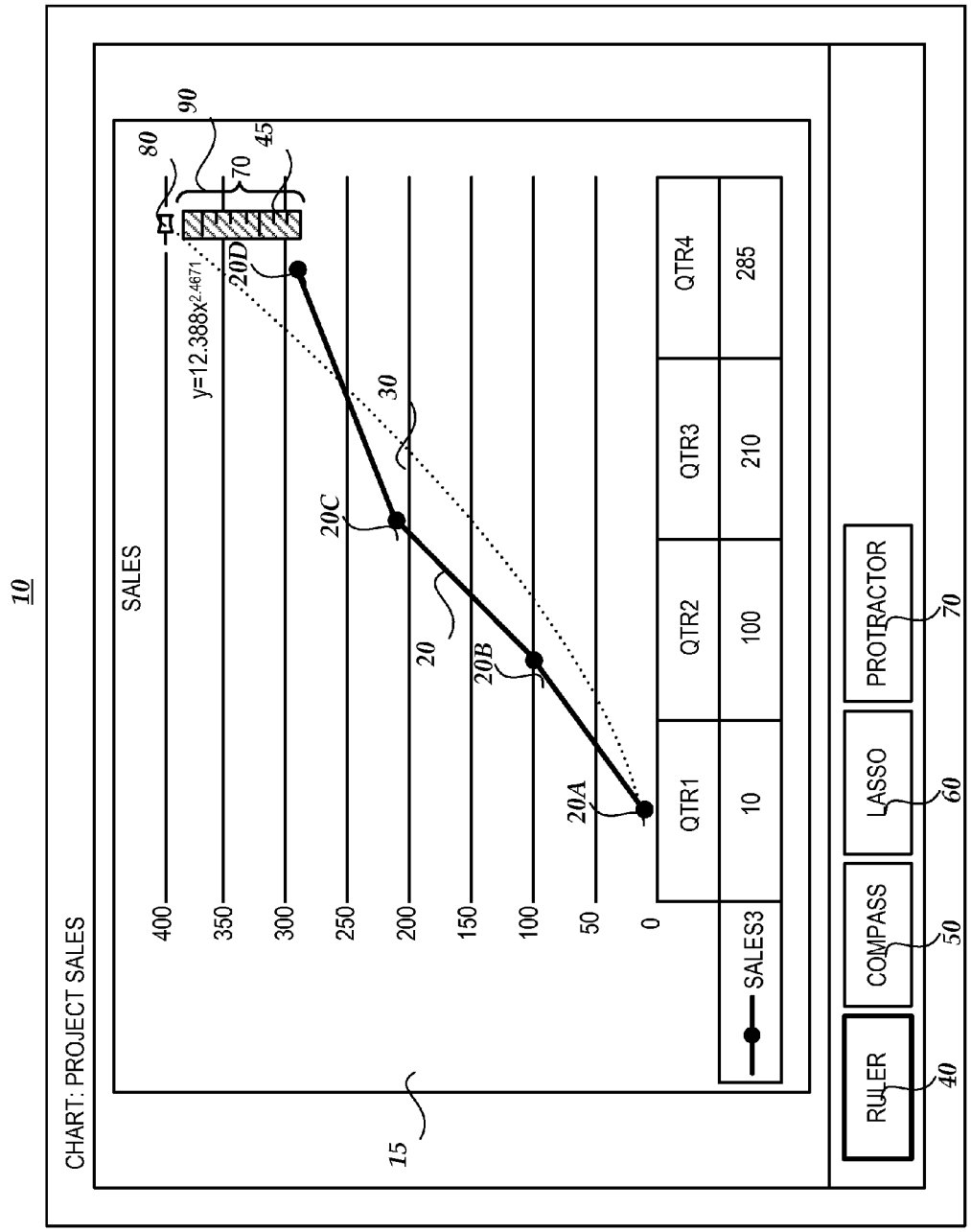
FIG. 1C is a user interface which may be utilized for making data point calculations on a chart, in accordance with an embodiment.

Turning now to FIG. 1C, the user interface 10 shows the results of the calculation performed on the chart data points selected by the ruler user control 45 in FIG. 1B. In particular, an annotation 90 is shown adjacent to the ruler user control 45 indicating the difference between the top of the line 30 and the data point 20D with respect to the y-axis of the chart 15. The user interface 10 also shows another user control (i.e., pin 80) displayed adjacent the ruler user control 45. In accordance with an embodiment, the pin 80 may be utilized to fix the ruler user control 45 in place in order to form the annotation 90.

Figure 2A:
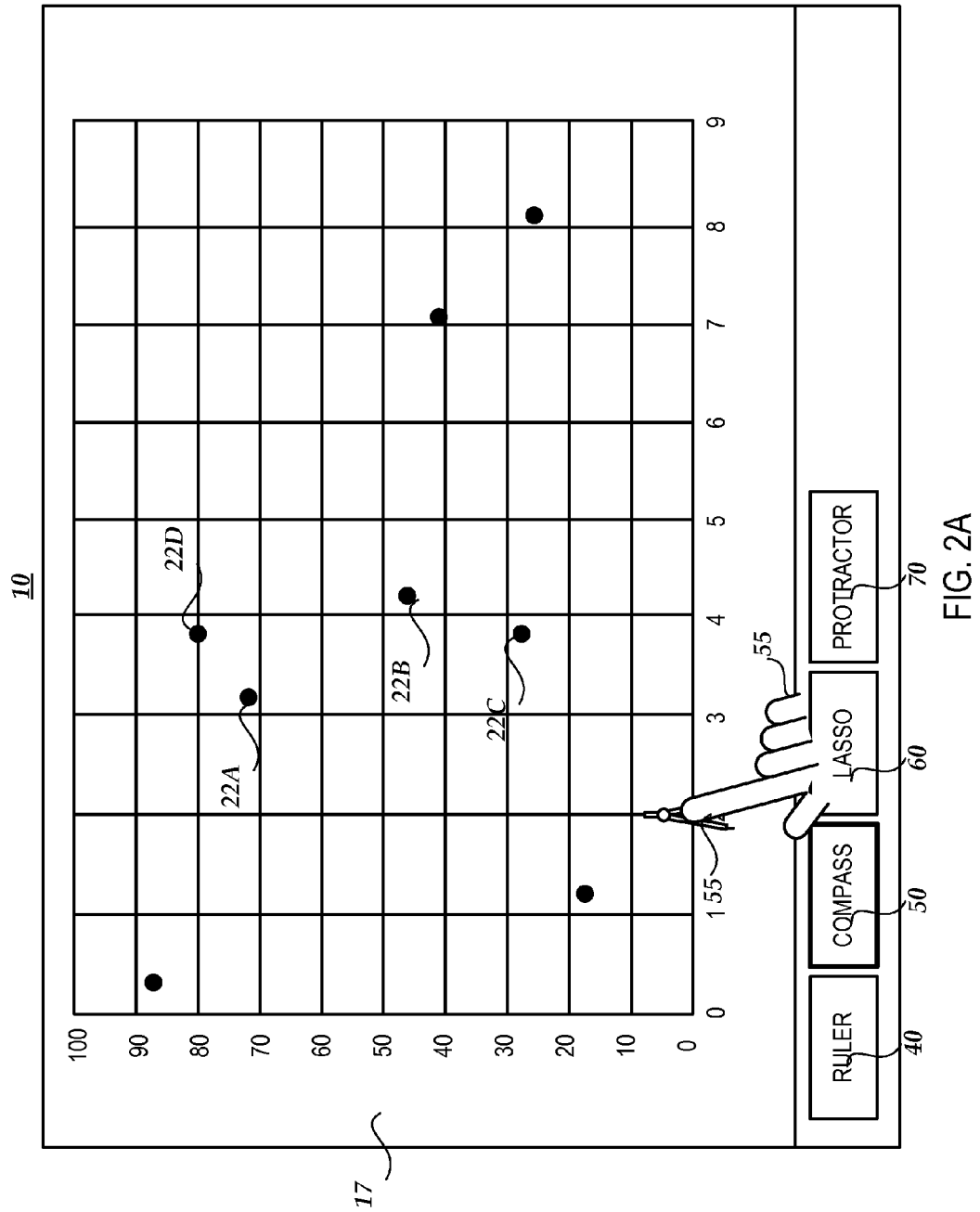
FIG. 2A is a user interface which may be utilized for making data point calculations on a chart, in accordance with an alternative embodiment.

FIG. 2A shows the user interface 10 which may be utilized for making data point calculations on a chart, in accordance with an alternative embodiment. The user interface 10 includes a scatter chart 17 comprising several data points including data points 22A-22D. The user interface 10 further comprises user control buttons 40, 50, 60 and 70 with the user control button 50 (i.e., the Compass button) being selected resulting in the display of the compass user control 55 adjacent to the chart 17.

Figure 2B:
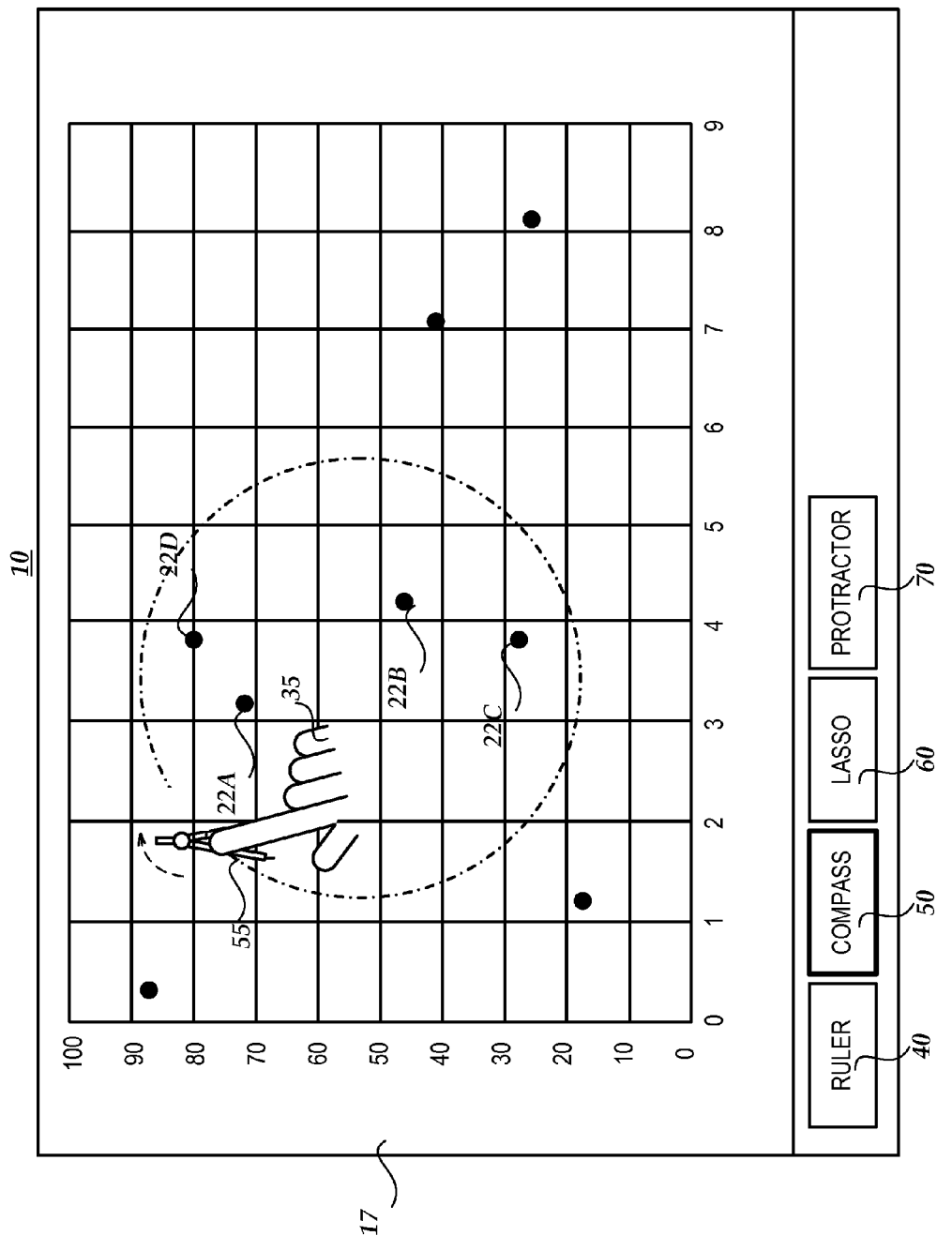
FIG. 2B is a user interface which may be utilized for making data point calculations on a chart, in accordance with an alternative embodiment.

Turning now to FIG. 2B, the user interface 10 shows the compass user control 55 after being moved by a user to select a set of data points for which a calculation is desired. In particular, the compass user control 55 is shown as being in the process of encircling data points 22A-22D on the chart 17 via touch input (using the hand 35) as a means of selecting these data points for performing a calculation.

Figure 2C:
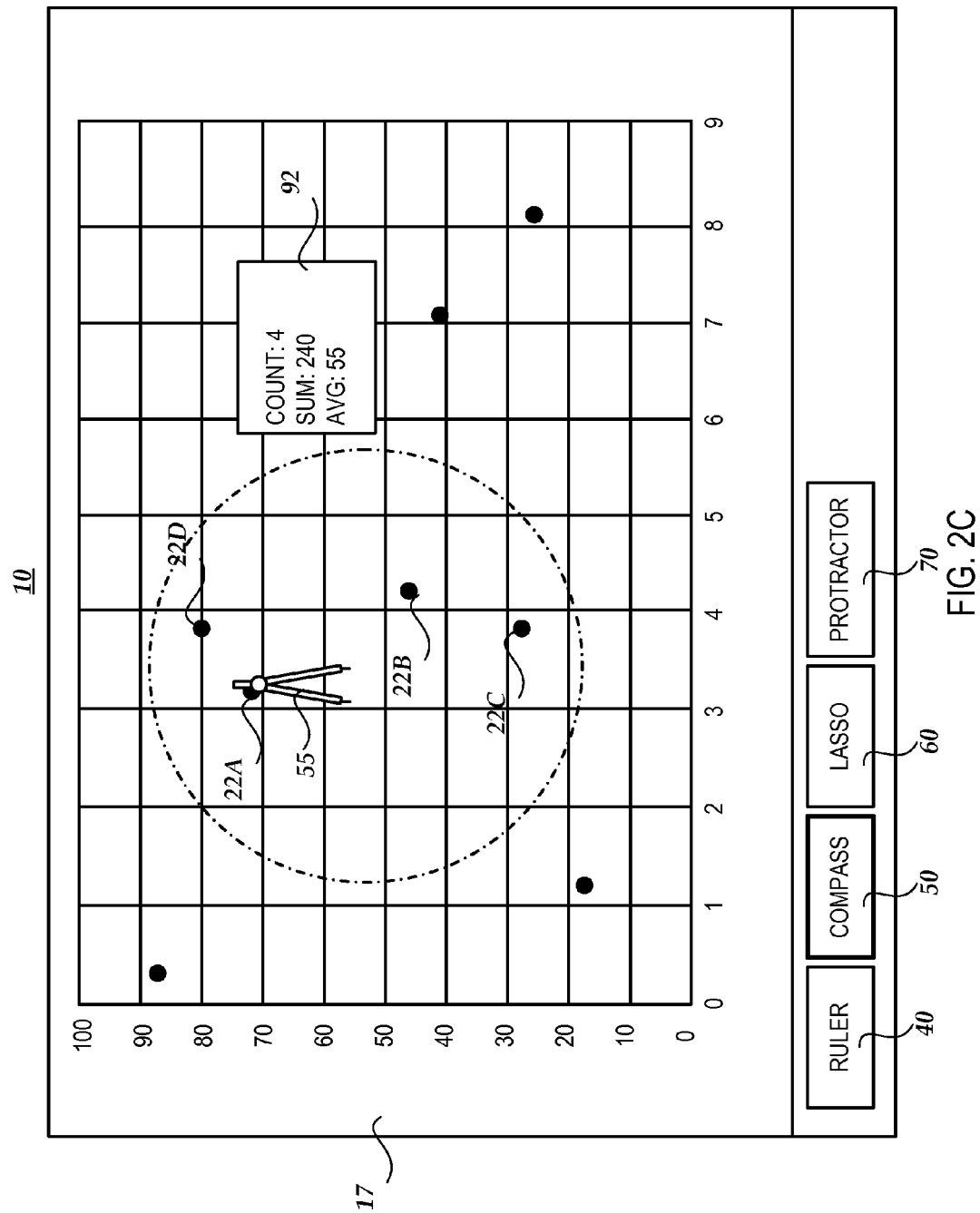
FIG. 2C is a user interface which may be utilized for making data point calculations on a chart, in accordance with an alternative embodiment.

Turning now to FIG. 2C, the user interface 10 shows the results of the calculation performed on the chart data points 22A-22D selected by the compass user control 55 in FIG. 2B. In particular, an annotation 92 is shown adjacent to the compass user control 55 indicating a count, sum and average of data values associated with the encircled data points 22A-22D. In accordance with an embodiment, the aforementioned calculation is initiated in response to a user removing the hand 35 from the compass user control 55 after completing the selection of the data points 22A-22D.

Figure 3A:
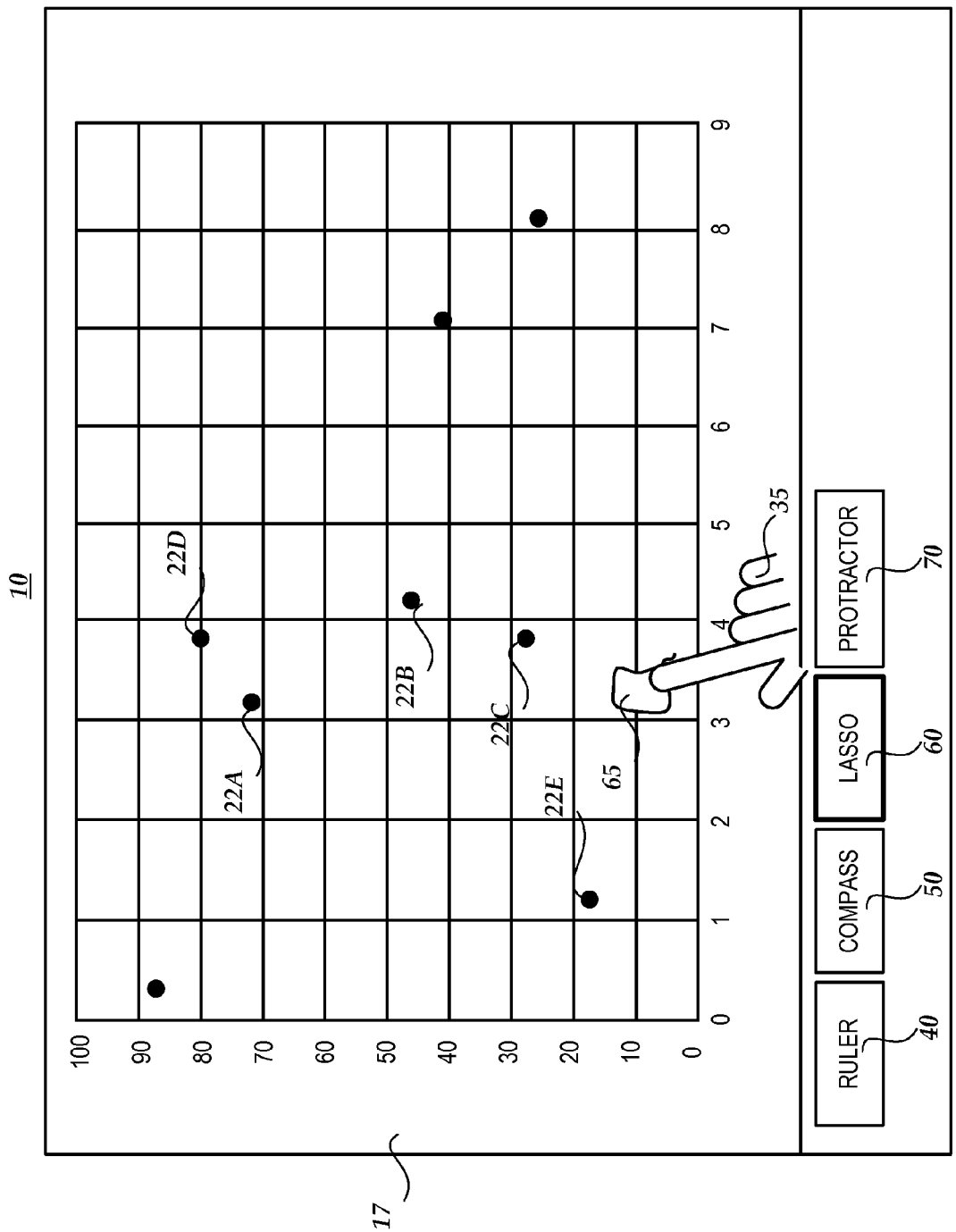
FIG. 3A is a user interface which may be utilized for making data point calculations on a chart, in accordance with another embodiment.

FIG. 3A shows the user interface 10 which may be utilized for making data point calculations on a chart, in accordance with another embodiment. The user interface 10 includes the scatter chart 17 comprising several data points including data points 22A-22E. The user interface 10 further comprises user control buttons 40, 50, 60 and 70 with the user control button 60 (i.e., the Lasso button) being selected resulting in the display of the lasso user control 65 adjacent to the chart 17.

Figure 3B:
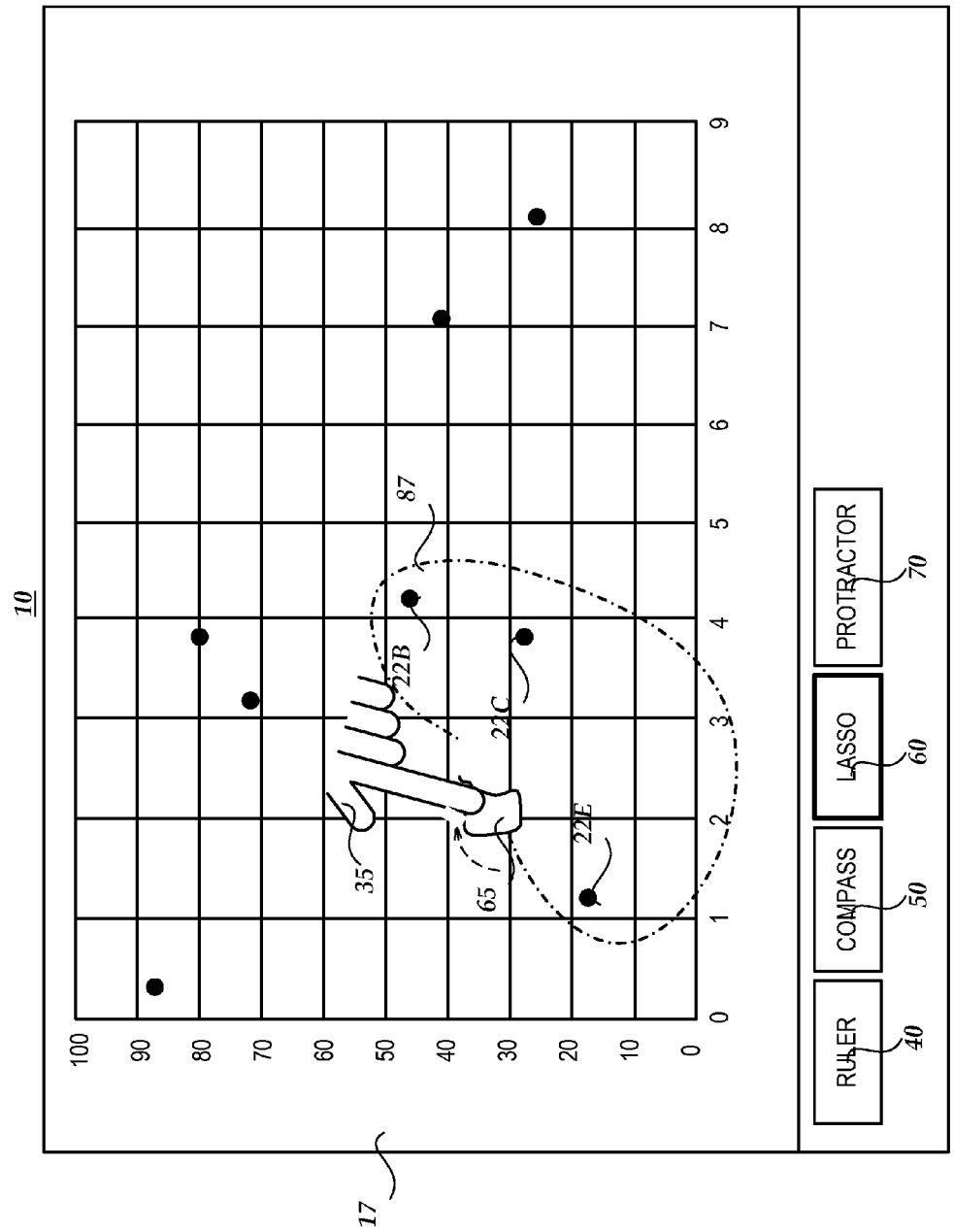
FIG. 3B is a user interface which may be utilized for making data point calculations on a chart, in accordance with another embodiment.

Turning now to FIG. 3B, the user interface 10 shows the lasso user control 65 after being moved by a user to select a set of data points for which a calculation is desired. In particular, the lasso user control 65 is shown as being in the process of selecting or "lassoing" data points 22B, 22C and 22E on the chart 17 via touch input (using the hand 35) as a means of selecting these data points for performing a calculation.

Figure 3C:
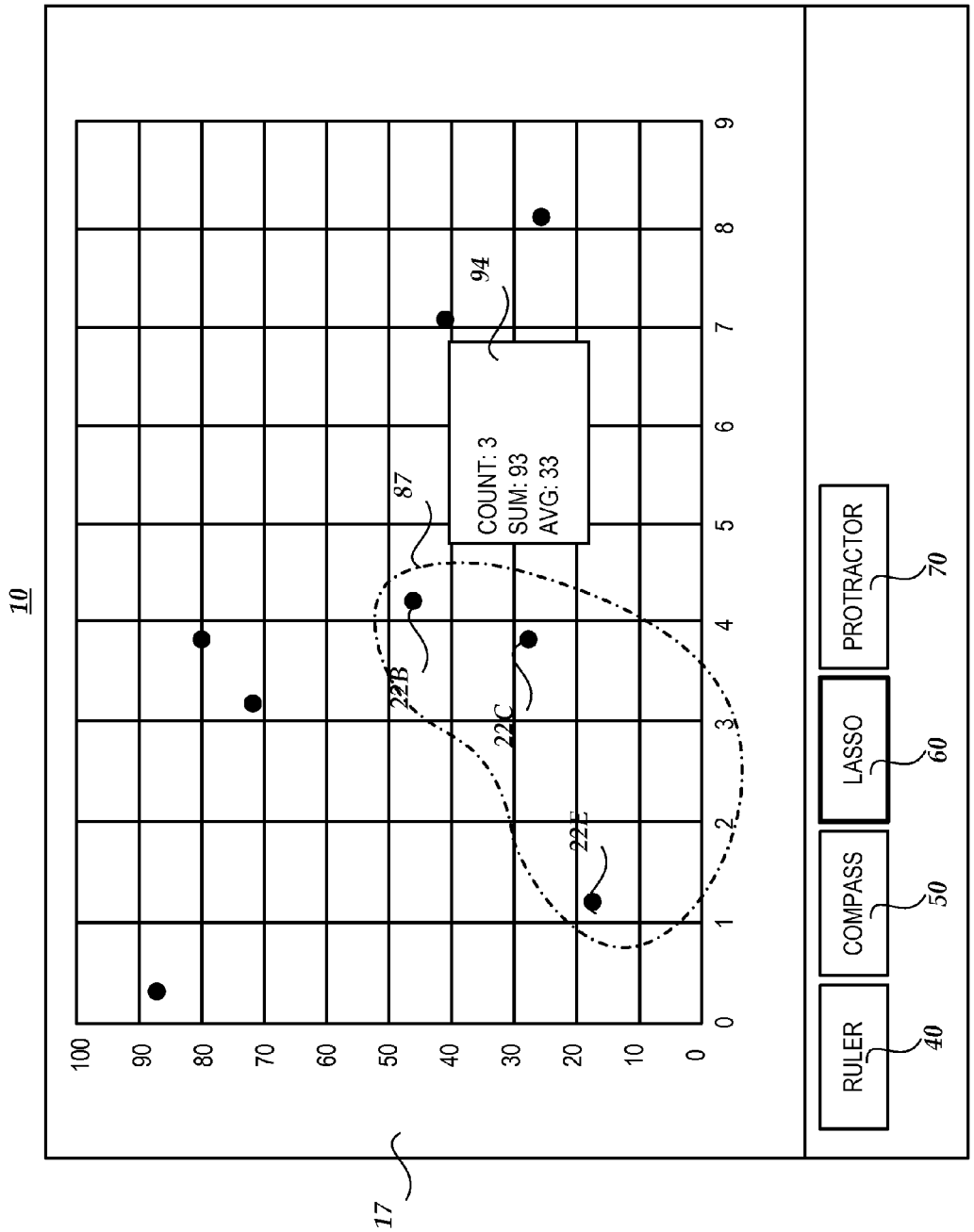
FIG. 3C is a user interface which may be utilized for making data point calculations on a chart, in accordance with another embodiment.

Turning now to FIG. 3C, the user interface 10 shows the results of the calculation performed on the chart data points 22B, 22C and 22E selected by the lasso user control 65 in FIG. 3B. In particular, an annotation 94 is shown adjacent to the lasso user control 65 indicating a count, sum and average of data values associated with the selected data points 22B, 22C and 22E. In accordance with an embodiment, the aforementioned calculation is initiated in response to a user removing the hand 35 from the lasso user control 65 after completing the selection of the data points 22B, 22C and 22E.

Figure 4A:
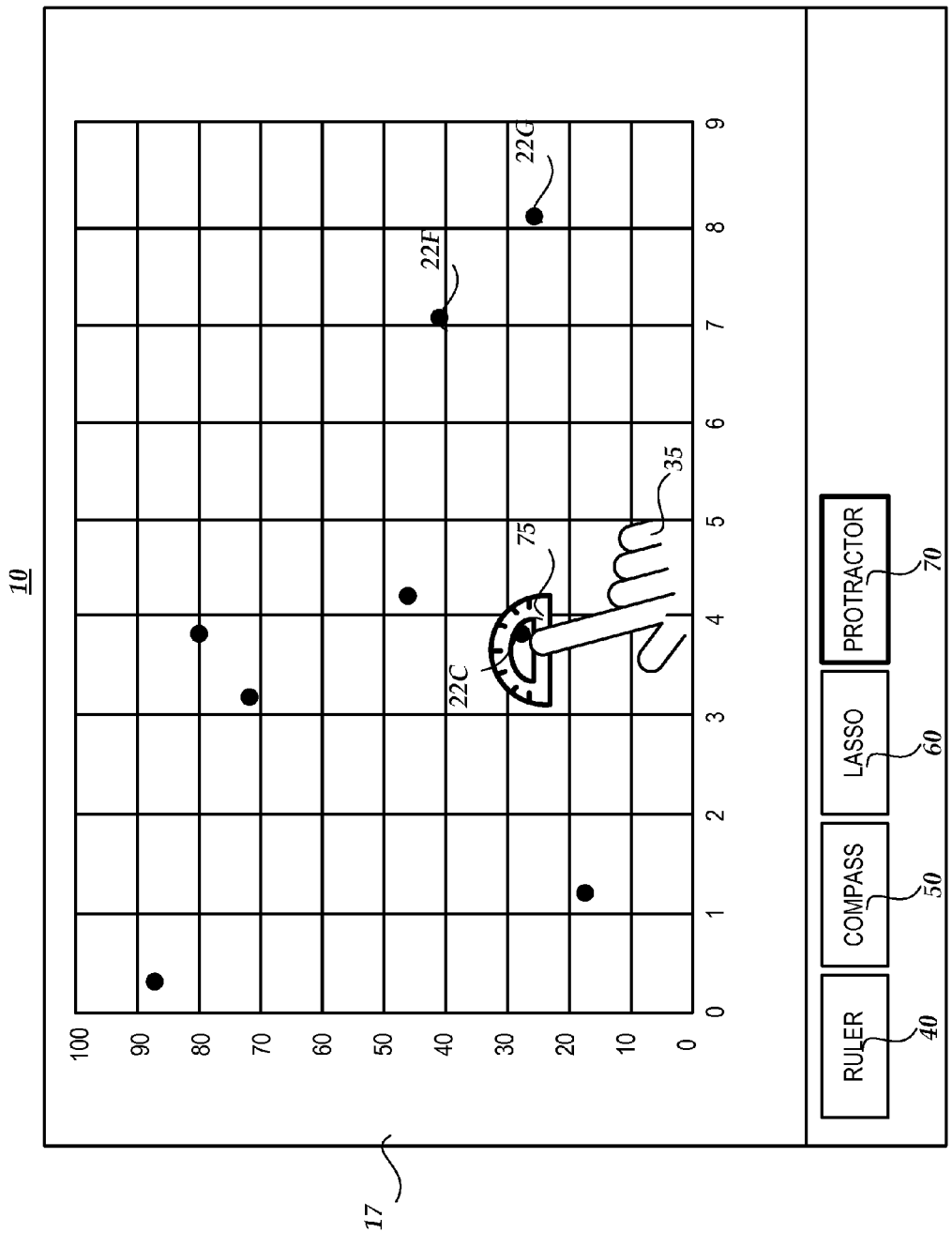
FIG. 4A is a user interface which may be utilized for making data point calculations on a chart, in accordance with another embodiment.

FIG. 4A shows the user interface 10 which may be utilized for making data point calculations on a chart, in accordance with another embodiment. The user interface 10 includes the scatter chart 17 comprising several data points including data points 22C, 22F and 22G. The user interface 10 further comprises user control buttons 40, 50, 60 and 70 with the user control button 70 (i.e., the Protractor button) being selected resulting in the display of the protractor user control 75 which has been selected by a user (via the hand 35) and moved to select the data point 22C as a first data point for performing a calculation on the chart 17.

Figure 4B:
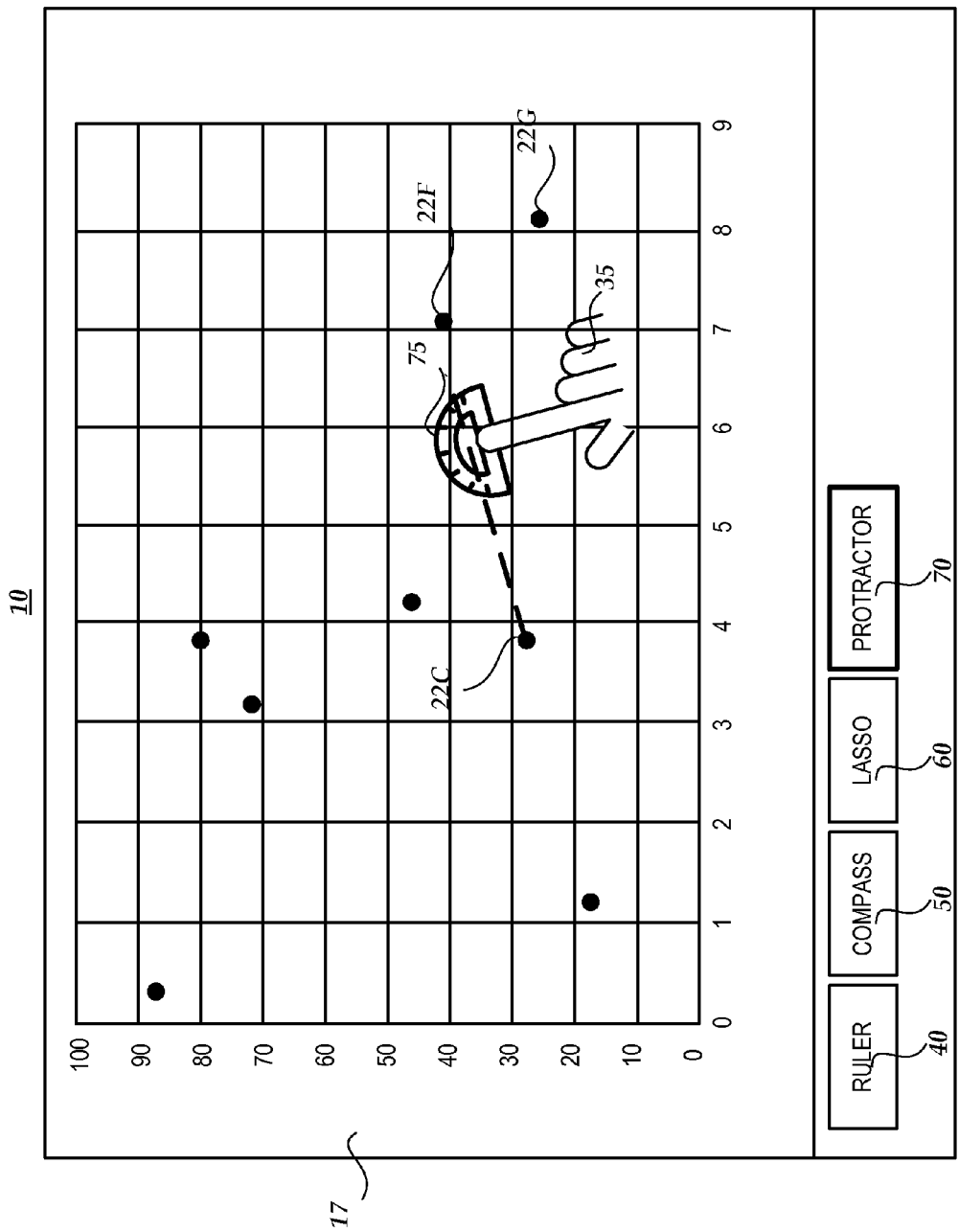
FIG. 4B is a user interface which may be utilized for making data point calculations on a chart, in accordance with another embodiment.
Figure 4C:
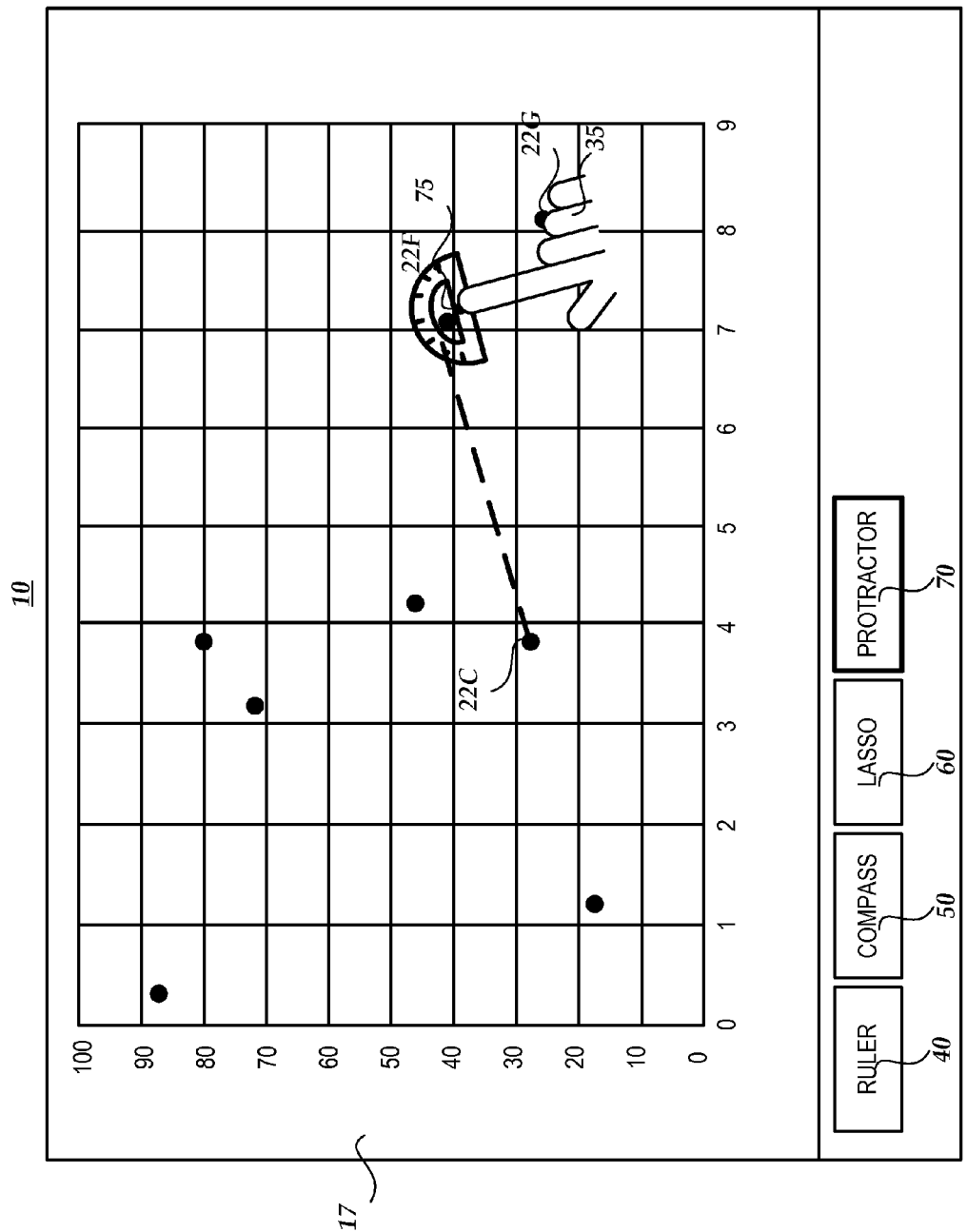
FIG. 4C is a user interface which may be utilized for making data point calculations on a chart, in accordance with another embodiment.

Turning now to FIGS. 4B-4C, the user interface 10 shows the protractor user control 75 in the process of being moved by a user to select another data point (i.e., the data point 22F) for performing a calculation including the previously selected data point 22C (as shown by the dashed line connecting the two data points).

Figure 4D:
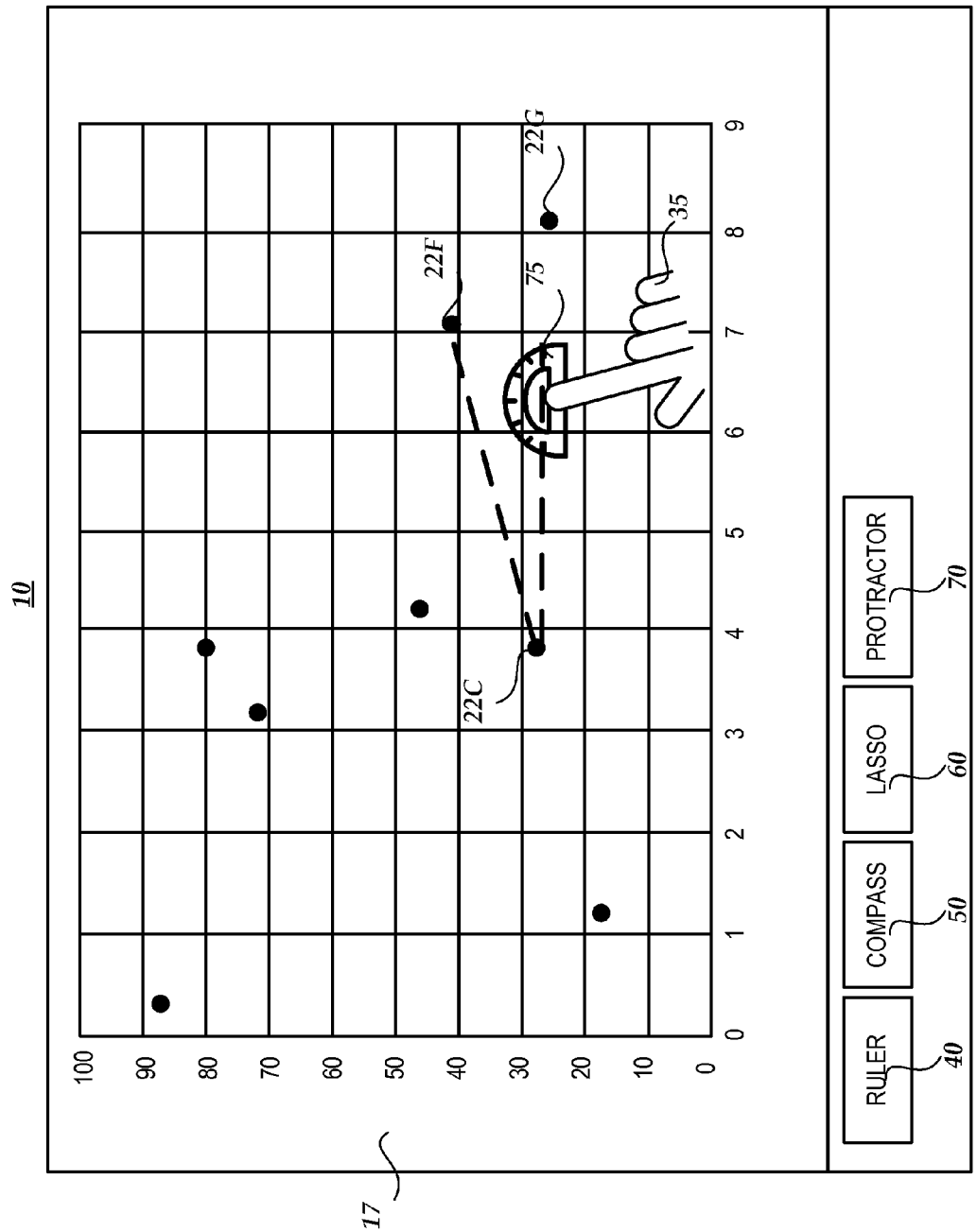
FIG. 4D is a user interface which may be utilized for making data point calculations on a chart, in accordance with another embodiment.
Figure 4E:
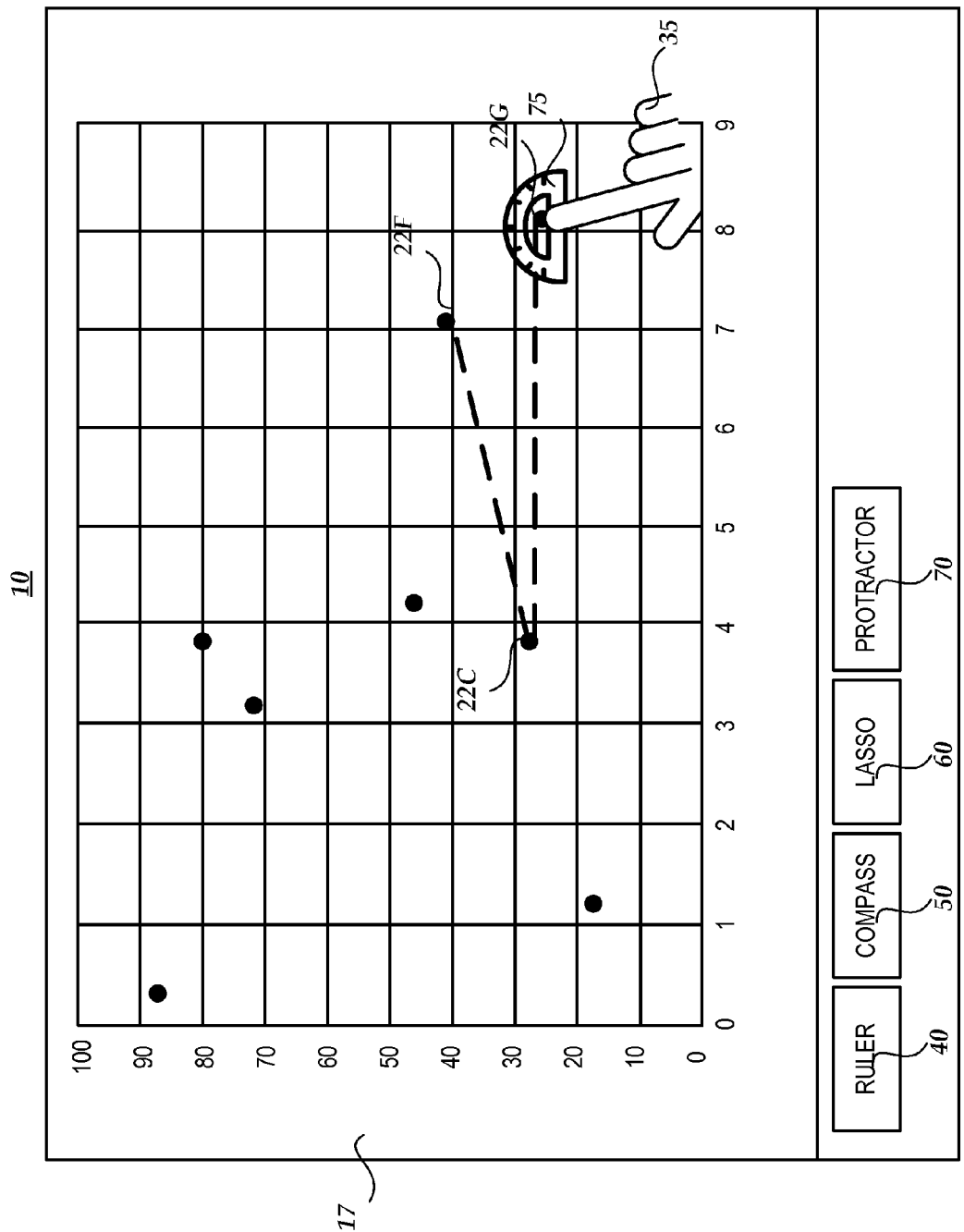
FIG. 4E is a user interface which may be utilized for making data point calculations on a chart, in accordance with another embodiment.

Turning now to FIGS. 4D-4E, the user interface 10 shows the protractor user control 75 in the process of being moved by a user to select another data point (i.e., the data point 22G) for performing a calculation including the previously selected data points 22C and 22F (as shown by the dashed line connecting the data points 22C and 22F and the dashed line connecting the data points 22C and 22G).

Figure 4F:
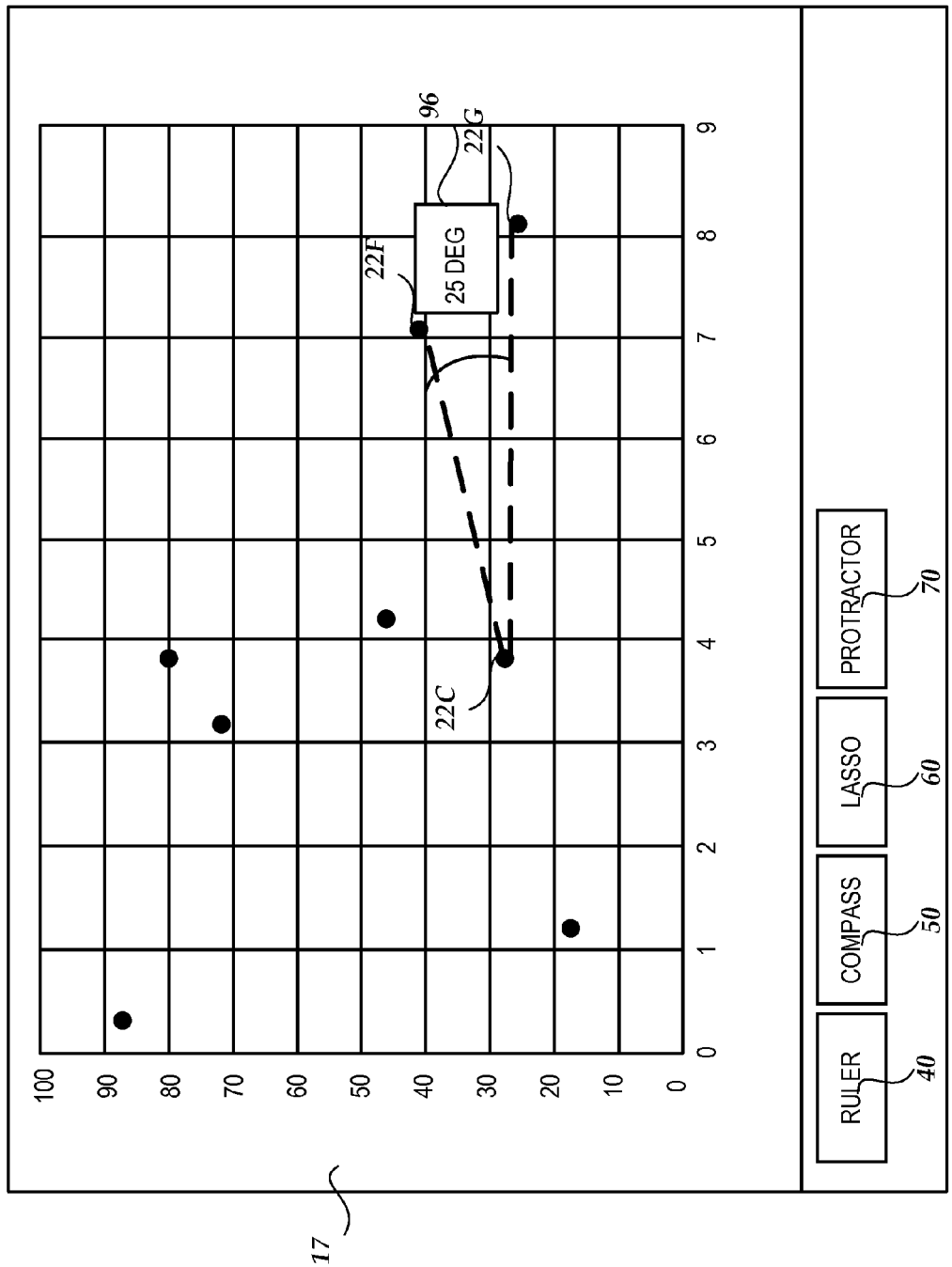
FIG. 4F is a user interface which may be utilized for making data point calculations on a chart, in accordance with another embodiment.

Turning now to FIG. 4F, the user interface 10 shows the results of the calculation performed on the chart data points 22C, 22F and 22G selected by the protractor user control 75 in FIGS. 4A-4E. In particular, an annotation 96 is shown adjacent to the protractor user control 75 indicating the angle formed between the two lines connecting the data points 22F and 22G to the data point 22C.

FIG. 5 is a flow diagram illustrating a routine 500 for making data point calculations on a chart, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 5 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 500 begins at operation 505, where an application executing on a computing device may display a user control adjacent to a chart. As discussed above with respect to FIGS. 1-4, the display of the user control may be initiated in response to a touch or other input on a user control button from a menu generated by the application. The selected user control may be associated with a particular calculation desired to be performed by a user. For example, the user control may comprise a ruler for calculating a difference between two data points on a chart or a protractor for calculating an angle between chart data points.

From operation 505, the routine 500 continues to operation 510, where the application executing on the computing device, may receive a selection of data points on the chart by the user control. In accordance with an embodiment, the application may receive the selection of chart data points by receiving a touch input on the user control and, in response to receiving the touch input, moving the user control to select each of a number of desired of data points on the chart for performing a calculation. In accordance with another embodiment, one or more data points may be automatically selected by the application upon determining that the user control is in proximity to a data point having emphasis (e.g., a "hot spot") on the chart (as discussed above with respect to FIG. 1B) and then moving (by the application) the user control to the nearest "hot spot." Subsequent data points for performing the calculation may then be selected either by the user (e.g., via manual touch input) or by the application to the next "hot spot."

From operation 510, the routine 500 continues to operation 515, where the application executing on the computing device, may perform a calculation on the chart data points selected by the user control at operation 510. As discussed above with respect to FIGS. 1-4, the calculations performed by the application may include, without limitation, a value difference calculation, an angular difference calculation, a count calculation, a sum calculation and an average calculation. It should be understood however, that other types of calculations (e.g., a percentage difference calculation) are also possible. It should further be understood that the aforementioned calculations may be performed with respect to chart data in any one of the x (horizontal), y (vertical) and z directions.

From operation 515, the routine 500 continues to operation 520, where the application executing on the computing device, may pin the user control to form an annotation. For example, as discussed above with respect to FIG. 1C, the pin 80 may be utilized to fix the ruler user control 45 in place in order to form the annotation 90.

From operation 520, the routine 500 continues to operation 525, where the application executing on the computing device, may display the results of the calculation performed at operation 515 in an annotation on the chart. From operation 525, the routine 500 then ends.

Figure 6:
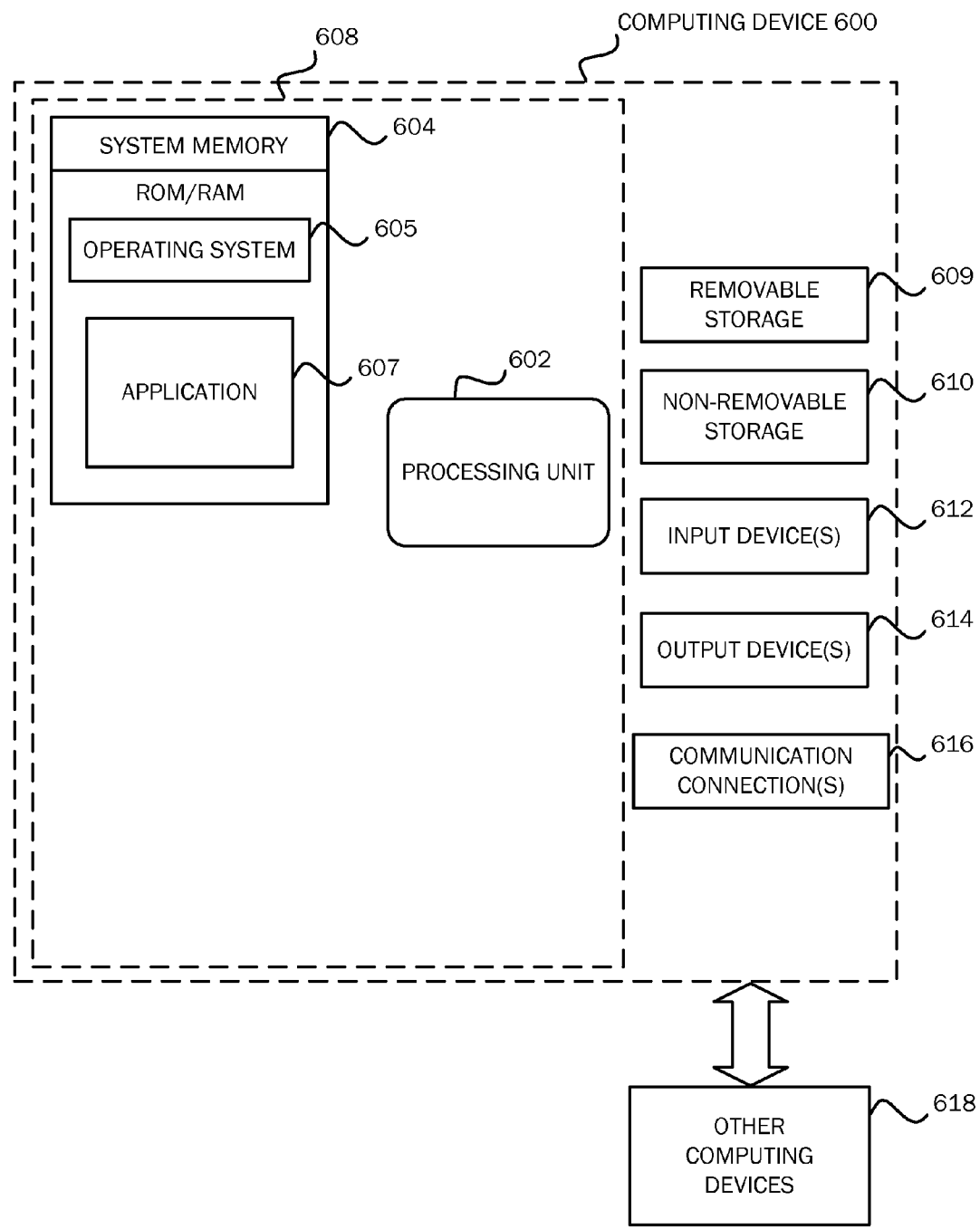
FIG. 6 is a simplified block diagram of a computing device with which various embodiments may be practiced.
Figure 7A:
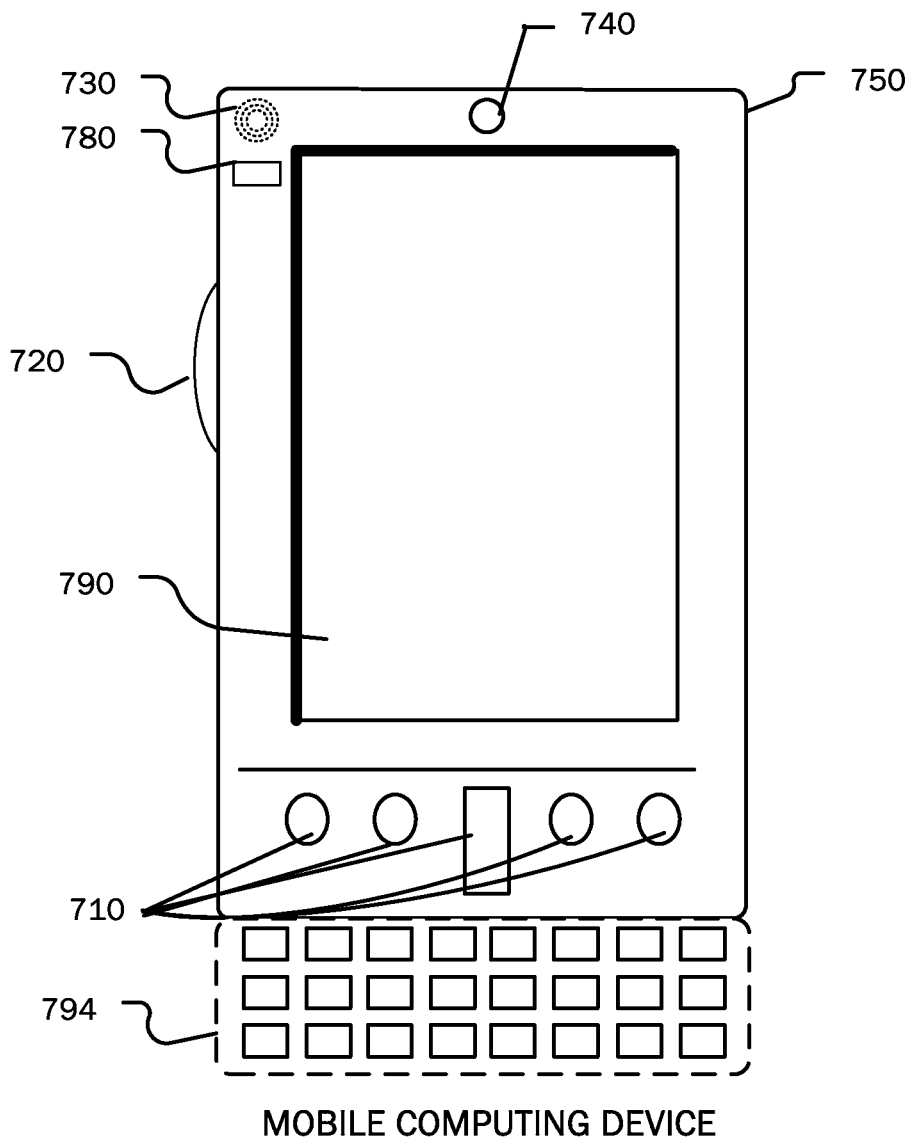
FIG. 7A is a simplified block diagram of a mobile computing device with which various embodiments may be practiced.
Figure 7B:
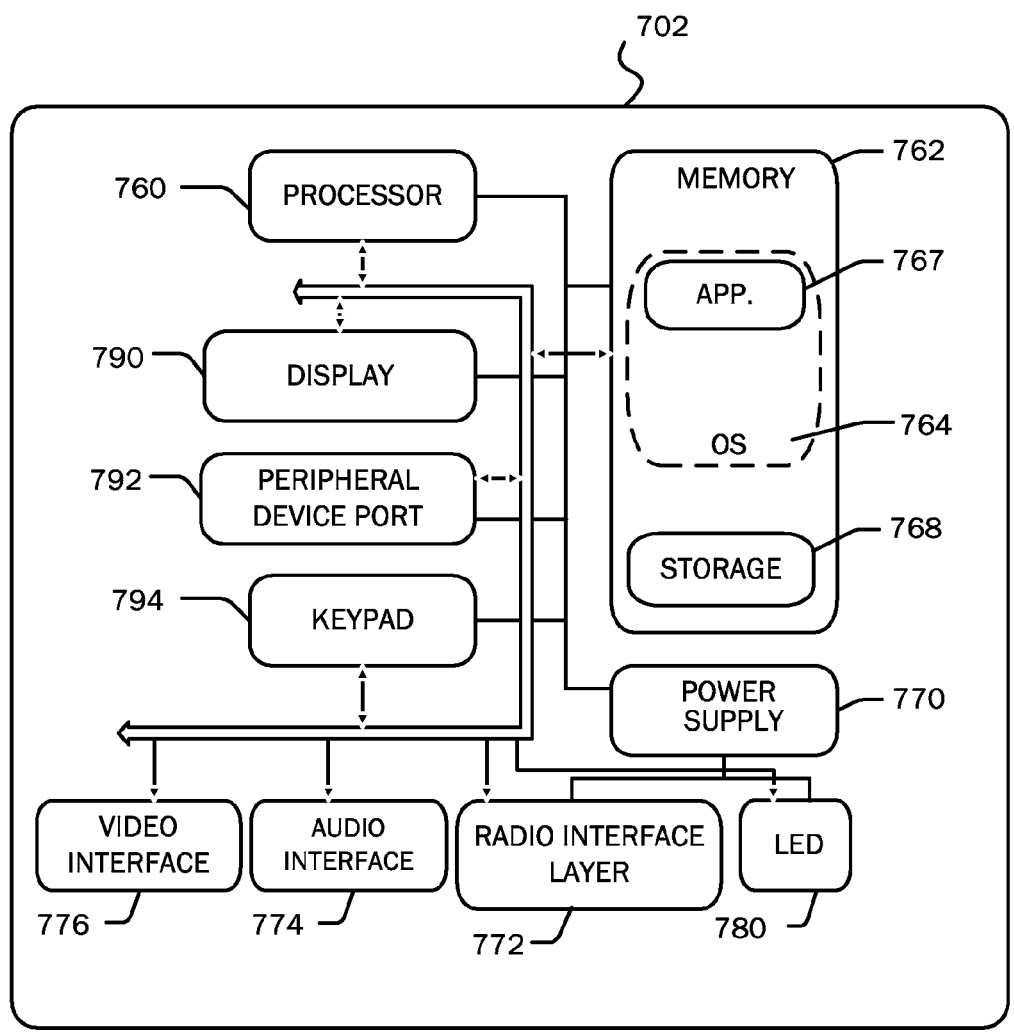
FIG. 7B is a simplified block diagram of a mobile computing device with which various embodiments may be practiced.
Figure 8:
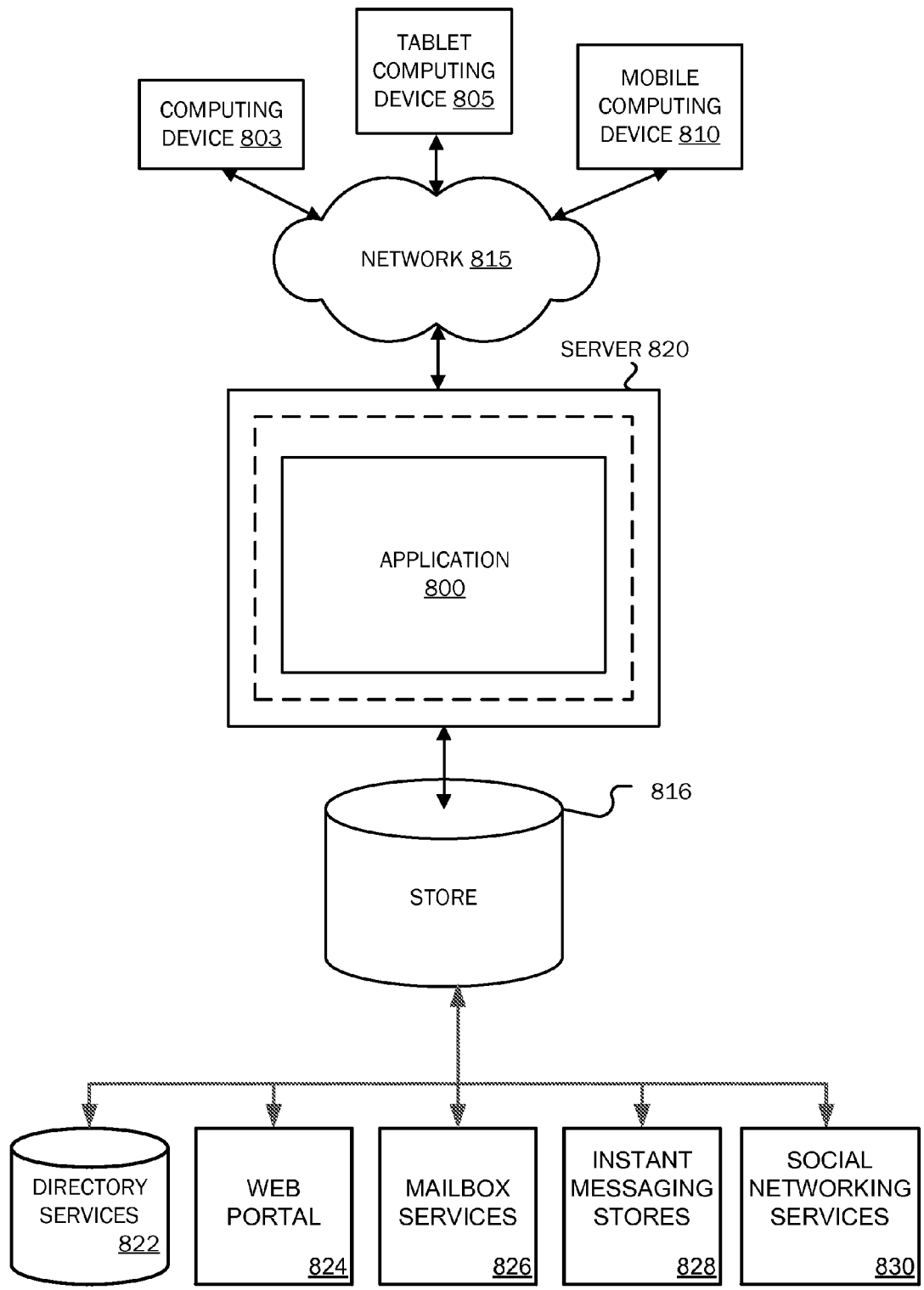
FIG. 8 is a simplified block diagram of a distributed computing system in which various embodiments may be practiced.

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating example physical components of a computing device 600 with which various embodiments may be practiced. In a basic configuration, the computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include an operating system 605 and application 607. Operating system 605, for example, may be suitable for controlling the computing device 600's operation and, in accordance with an embodiment, may comprise the WINDOWS operating systems from MICROSOFT CORPORATION of Redmond, Wash. The application 607, for example, may comprise functionality for performing routines including, for example, making data point calculations on a chart, as described above with respect to the operations in routines 500 of FIG. 5. In accordance with an embodiment, the application 607 may comprise a productivity software application (or alternatively, a productivity software application suite) for creating, viewing and editing charts such as the EXCEL spreadsheet application program from MICROSOFT CORPORATION of Redmond, Wash. It should be understood however, that the application 607 may also comprise other types of productivity software applications including, but not limited to, word processing applications, presentation applications and note-taking/collaboration applications. It should further be understood, however, that the embodiments described herein may also be practiced in conjunction with other application programs and further, is not limited to any particular application or system.

The computing device 600 may have additional features or functionality. For example, the computing device 600 may also include additional data storage devices (removable and/or non-removable) such as, for example, magnetic disks, optical disks, solid state storage devices ("SSD"), flash memory or tape. Such additional storage is illustrated in FIG. 6 by a removable storage 609 and a non-removable storage 610. The computing device 600 may also have input device(s) 612 such as a keyboard, a mouse, a pen, a sound input device (e.g., a microphone), a touch input device for receiving gestures, an accelerometer or rotational sensor, etc. Output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 600 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a suitable mobile computing environment, for example, a mobile computing device 750 which may include, without limitation, a smartphone, a tablet personal computer, a laptop computer, and the like, with which various embodiments may be practiced. With reference to FIG. 7A, an example mobile computing device 750 for implementing the embodiments is illustrated. In a basic configuration, mobile computing device 750 is a handheld computer having both input elements and output elements. Input elements may include touch screen display 725 and input buttons 710 that allow the user to enter information into mobile computing device 750. Mobile computing device 750 may also incorporate an optional side input element 720 allowing further user input. Optional side input element 720 may be a rotary switch, a button, or any other type of manual input element. In alternative embodiments, mobile computing device 750 may incorporate more or less input elements. In yet another alternative embodiment, the mobile computing device is a portable telephone system, such as a cellular phone having display 725 and input buttons 710. Mobile computing device 750 may also include an optional keypad 705. Optional keypad 705 may be a physical keypad or a "soft" keypad generated on the touch screen display.

Mobile computing device 750 incorporates output elements, such as display 725, which can display a graphical user interface (GUI). Other output elements include speaker 730 and LED 780. Additionally, mobile computing device 750 may incorporate a vibration module (not shown), which causes mobile computing device 750 to vibrate to notify the user of an event. In yet another embodiment, mobile computing device 750 may incorporate a headphone jack (not shown) for providing another means of providing output signals.

Although described herein in combination with mobile computing device 750, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 7B is a block diagram illustrating components of a mobile computing device used in one embodiment, such as the mobile computing device 750 shown in FIG. 7A. That is, mobile computing device 750 can incorporate a system 702 to implement some embodiments. For example, system 702 can be used in implementing a "smartphone" that can run one or more applications similar to those of a desktop or notebook computer. In some embodiments, the system 702 is integrated as a computing device, such as an integrated personal digital assistant (PDA) and wireless phone.

Application 767 may be loaded into memory 762 and run on or in association with an operating system 764. The system 702 also includes non-volatile storage 768 within memory the 762. Non-volatile storage 768 may be used to store persistent information that should not be lost if system 702 is powered down. The application 767 may use and store information in the non-volatile storage 768. The application 767, for example, may comprise functionality for performing routines including, for example, making data point calculations on a chart, as described above with respect to the operations in routines 500 of FIG. 5. A synchronization application (not shown) also resides on system 702 and is programmed to interact with a corresponding synchronization application resident on a host computer to keep the information stored in the non-volatile storage 768 synchronized with corresponding information stored at the host computer. As should be appreciated, other applications may also be loaded into the memory 762 and run on the mobile computing device 750.

The system 702 has a power supply 770, which may be implemented as one or more batteries. The power supply 770 might further include an external power source, such as an AC adapter or a powered docking cradle that supplements or recharges the batteries.

The system 702 may also include a radio 772 (i.e., radio interface layer) that performs the function of transmitting and receiving radio frequency communications. The radio 772 facilitates wireless connectivity between the system 702 and the "outside world," via a communications carrier or service provider. Transmissions to and from the radio 772 are conducted under control of OS 764. In other words, communications received by the radio 772 may be disseminated to the application 767 via OS 764, and vice versa.

The radio 772 allows the system 702 to communicate with other computing devices, such as over a network. The radio 772 is one example of communication media. The embodiment of the system 702 is shown with two types of notification output devices: the LED 780 that can be used to provide visual notifications and an audio interface 774 that can be used with speaker 730 to provide audio notifications. These devices may be directly coupled to the power supply 770 so that when activated, they remain on for a duration dictated by the notification mechanism even though processor 760 and other components might shut down for conserving battery power. The LED 780 may be programmed to remain on indefinitely until the user takes action to indicate the powered-on status of the device. The audio interface 774 is used to provide audible signals to and receive audible signals from the user. For example, in addition to being coupled to speaker 730, the audio interface 774 may also be coupled to a microphone (not shown) to receive audible (e.g., voice) input, such as to facilitate a telephone conversation. In accordance with embodiments, the microphone may also serve as an audio sensor to facilitate control of notifications. The system 702 may further include a video interface 776 that enables an operation of on-board camera 740 to record still images, video streams, and the like.

A mobile computing device implementing the system 702 may have additional features or functionality. For example, the device may also include additional data storage devices (removable and/or non-removable) such as, magnetic disks, optical disks, or tape. Such additional storage is illustrated in FIG. 7B by storage 768.

Data/information generated or captured by the mobile computing device 750 and stored via the system 702 may be stored locally on the mobile computing device 750, as described above, or the data may be stored on any number of storage media that may be accessed by the device via the radio 772 or via a wired connection between the mobile computing device 750 and a separate computing device associated with the mobile computing device 750, for example, a server computer in a distributed computing network such as the Internet. As should be appreciated such data/information may be accessed via the mobile computing device 750 via the radio 772 or via a distributed computing network. Similarly, such data/information may be readily transferred between computing devices for storage and use according to well-known data/information transfer and storage means, including electronic mail and collaborative data/information sharing systems.

FIG. 8 is a simplified block diagram of a distributed computing system in which various embodiments may be practiced. The distributed computing system may include number of client devices such as a computing device 803, a tablet computing device 805 and a mobile computing device 810. The client devices 803, 805 and 810 may be in communication with a distributed computing network 815 (e.g., the Internet). A server 820 is in communication with the client devices 803, 805 and 810 over the network 815. The server 820 may store application 800 which may be perform routines including, for example, making data point calculations on a chart, as described above with respect to the operations in routines 500 of FIG. 5. Content developed, interacted with, or edited in association with the application 800 may be stored in different communication channels or other storage types. For example, various documents may be stored using a directory service 822, a web portal 824, a mailbox service 826, an instant messaging store 828, or a social networking site 830.

The application 800 may use any of these types of systems or the like for enabling data utilization, as described herein. The server 820 may provide the proximity application 800 to clients. As one example, the server 820 may be a web server providing the application 800 over the web. The server 820 may provide the application 800 over the web to clients through the network 815. By way of example, the computing device 10 may be implemented as the computing device 803 and embodied in a personal computer, the tablet computing device 805 and/or the mobile computing device 810 (e.g., a smart phone). Any of these embodiments of the computing devices 803, 805 and 810 may obtain content from the store 816.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method comprising:
    displaying, by a computing device, a user control adjacent to a chart, the user control having a scale dynamically conforming to a value range of an axis of the chart;
    receiving, by the computing device, a selection of a plurality of data points on the chart by the user control, wherein receiving the selection of the plurality of data points comprises:
        designating a plurality of emphasis points on the chart, wherein the plurality of emphasis points comprises at least a first emphasis point and a second emphasis point;
        receiving a first user input;
        determining that the user control has been placed within a first proximity of the first emphasis point;
        based upon the determination, automatically moving the user control to the first emphasis point;
        receiving a second user input, wherein the second input is received in a second proximity to the second emphasis point; and
        automatically selecting the second emphasis point;
    performing, by the computing device, a calculation on the plurality of data points; and
    displaying, by the computing device, results of the calculation on the chart.

2. The method of claim 1, further comprising pinning the user control to form an annotation.

3. The method of claim 1, wherein displaying, by the computing device, a user control adjacent to a chart comprises displaying a ruler adjacent to the chart.

4. The method of claim 1, wherein displaying, by the computing device, a user control adjacent to a chart comprises displaying a protractor adjacent to the chart, the protractor displaying the scale.

5. The method of claim 1, wherein receiving the first user input comprises receiving a touch input on the user control.

6. The method of claim 1, wherein performing, by the computing device, a calculation on the plurality of data points selected by the user control comprises performing one or more of a value difference calculation, an angular difference calculation, a count calculation, a sum calculation, a percentage difference calculation, and an average calculation.

7. The method of claim 1, wherein performing, by the computing device, a calculation on the plurality of data points selected by the user control comprises performing the calculation with respect to one or more of a vertical axis and a horizontal axis on the chart.

8. The method of claim 7, wherein performing, by the computing device, a calculation on the plurality of data points selected by the user control further comprises performing the calculation with respect to a z-axis on the chart.

9. The method of claim 1, wherein the user control is utilized to perform a value difference calculation on the plurality of data points.

10. The method of claim 9, wherein the user control is a ruler.

11. The method of claim 1, wherein the user control is utilized to perform an angular difference calculation on the plurality of data points.

12. The method of claim 11, wherein the user control is a protractor.

13. The method of claim 1, wherein the first and second emphasis points are identified by a displayed effect.

14. The method of claim 13, wherein the displayed effect comprises one of:
    a highlight;
    a color; and
    a blinking effect.

15. A computing device comprising:
    at least one processor; and
    a memory encoding computer executable instructions that, when executed by the at least one processor, perform a method comprising:
        displaying a user control adjacent to a chart the user control having a scale dynamically conforming to a value range of an axis of the chart;
        receiving a selection of a plurality of data points on the chart by the user control wherein receiving a selection of data points comprises:
            designating a plurality of emphasis points on the chart, wherein the plurality of emphasis points comprises at least a first emphasis point and a second emphasis point;
            receiving a first user input;
            determining that the user control has been placed within a first proximity of the first emphasis point;
            based upon the determination, automatically moving the user control to the first emphasis point;
            receiving a second user input, wherein the second input is received in a second proximity to the second emphasis point; and
            automatically selecting the second emphasis point;
        performing a calculation on the plurality of data points; and
        displaying results of the calculation on the chart.

16. The computing device of claim 15, wherein the user control is utilized to perform a value difference calculation on the plurality of data points.

17. The computing device of claim 16, wherein the user control is a ruler.

18. The computing device of claim 15, wherein the user control is utilized to perform an angular difference calculation on the plurality of data points.

19. The computing device of claim 15, wherein receiving the first user input comprises receiving a touch input.

20. A computer storage medium comprising computer executable instructions that, when executed by at least one processor, perform a method comprising:
    displaying, by a computing device, a user control adjacent to a chart, the user control having a scale dynamically conforming to a value range of an axis of the chart;
    receiving, by the computing device, a selection of a plurality of data points on the chart by the user control, wherein receiving the selection of the plurality of data points comprises:

designating a plurality of emphasis points on the chart, wherein the plurality of emphasis points comprises at least a first emphasis point and a second emphasis point;
receiving a first user input;
determining that the user control has been placed within a first proximity of the first emphasis point;
based upon the determination, automatically moving the user control to the first emphasis point;
receiving a second user input, wherein the second input is received in a second proximity to the second emphasis point; and
automatically selecting the second emphasis point;
performing, by the computing device, a calculation on the plurality of data points; and
displaying, by the computing device, results of the calculation on the chart.

\* \* \* \* \*